Jan. 11, 1927.

P. P. YEJOFF 1,613,974

GAME

Filed Oct. 14, 1925    2 Sheets-Sheet 1

INVENTOR
Paul P. Yejoff
BY
G. Wright Arnold
ATTORNEY

Jan. 11, 1927. 1,613,974
P. P. YEJOFF
GAME
Filed Oct. 14, 1925   2 Sheets-Sheet 2

*Fig. 2*

| Moving Range | Abbreviations Printed on Figures | Warcrafts | Battleship 1st Class | Battleship 2nd Class | Battleship 3rd Class | Cruiser | Scout Cruiser | Destroyer | Submarine | Submarine Coastal Def. | Minelayer | Minesweeper | Subchaser | Transport |
|---|---|---|---|---|---|---|---|---|---|---|---|---|---|---|
| 1 | B.S. 1 | Battleship 1-Class | ● | ↓ | ↓ | ↓ | ↓ | ↓ | ↰ | ↰ | ↓ | ↓ | ↓ | ↓ |
| 1 | B.S. 2 | Battleship 2-Class | — | ● | ↓ | ↓ | ↓ | ↓ | ↰ | ↰ | ↓ | ↓ | ↓ | ↓ |
| 1 | B.S. 3 | Battleship 3-Class | — | — | ● | ↓ | ↓ | ↓ | ↰ | ↰ | ↓ | ↓ | ↓ | ↓ |
| 1 | CR. | Cruiser | — | — | — | ● | ↓ | ↓ | ↰ | ↰ | ↓ | ↓ | ↓ | ↓ |
| 1 or 2 | S.CR. | Scout Cruiser | — | — | — | — | ● | ↓ | ↰ | ↰ | ↓ | ↓ | ↓ | ↓ |
| 1 or 2 | DSR. | Destroyer | — | — | — | — | — | ● | ↓ | ↓ | ↓ | ↓ | ↓ | ↓ |
| 1 | SM. | Submarine | — | — | — | — | — | — | ● | ● | ↓ | ↓ | ↵ | ↓ |
| 1 | SM. c.d. | Submarine Coastal Def. | — | — | — | — | — | — | — | ● | ↓ | ↓ | ↵ | ↓ |
| 1 | ML. | Minelayer | — | — | — | — | — | — | — | — | | + | + | + |
| 1 | MS. | Minesweeper | — | — | — | — | — | — | — | — | | | + | + |
| 1 | SCH. | Subchaser | — | — | — | — | — | — | — | — | | | | + |
| 1 | TP. | Transport | — | — | — | — | — | — | — | — | | | | + |
| Stationary | M | Mine | ↓ | ↓ | ↓ | ↓ | ↓ | ↓ | ↓ | | ↵ | ↓ | ↓ | |

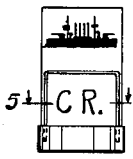
*Fig. 3*

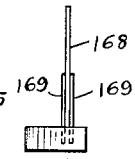
*Fig. 4*

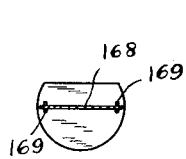
*Fig. 5*

*Fig. 6*

| B.S. 1 | B.S. 2 | B.S. 3 | C.R. | S.C.R. | DSR. |
|---|---|---|---|---|---|
| SM. | SM. c.d. | M.L. | M.S. | SCH. | TP. |

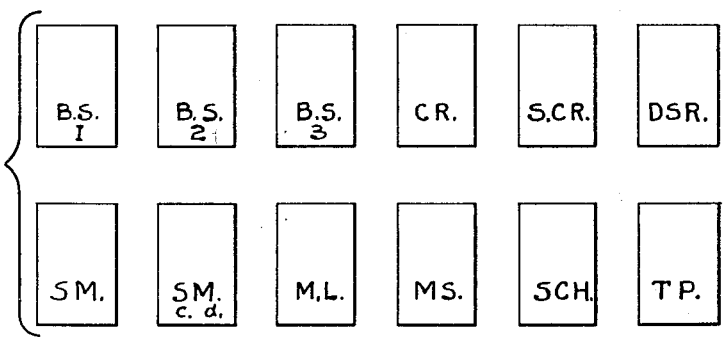

| Each | Battleship-1.cl | 100 | Scout Cruiser | 30 |
| " | " 2-cl | 90 | Destroyer | 15 |
| " | " 3-cl | 75 | Submarine | 40 |
| " | Cruiser | 40 | Subm.C.Def. | 25 |
| " | | | Subchaser | 10 |

*Fig. 8*

*Fig. 7*

INVENTOR
Paul P. Yejoff
BY
G. Wright Arnold
ATTORNEY

Patented Jan. 11, 1927.

1,613,974

UNITED STATES PATENT OFFICE.

PAUL P. YEJOFF, OF SEATTLE, WASHINGTON.

GAME.

Application filed October 14, 1925. Serial No. 62,352.

My invention relates to the art of games. More particularly, my invention pertains to a game which employs figures representing two fleets, each fleet representing the various types of naval vessels, such as the battleship, first class; battleship, second class; battleship, third class; cruiser; scout cruiser; destroyer; submarine; coastal defense submarine; mine-layer; minesweeper, subchaser; transport; and mine. Be it noted that these are the terms which describe in a general way the vessels of the navy, and are not intended to be technically accurate.

A primary object of my invention is to provide a game which has a field of play representing the open sea, and having on said field of play bays, said field of play having stations at regularly spaced intervals, upon which stations playing figures representing the various types of vessels of a country's navy, which are characterized by being of different strength and speed, and, therefore, of different values, may be located, or to which stations the said members or figures may be moved.

Furthermore, besides providing a game of absorbing amusement interest, I purpose providing a game which will be instructive respecting the various types of vessels of the country's navy and their special functions.

The above mentioned general objects of my invention, together with others inherent in the same, are attained by the device illustrated in the following drawings, the same being merely a preferred exemplary form of embodiment of my invention, throughout which drawings like reference numerals indicate like parts:

Fig. 2 represents a chart or table which explains the value of each figure in relation to the other figures, whereby it may be readily ascertained when the two figures meet face to face, i. e., in opposing stations on the field of play, which figure must give way to the other;

Fig. 3 is a view in elevation of the face of a playing figure, the back being plain and disposed toward the opponent;

Fig. 4 is a view in side elevation of said playing figure;

Fig. 5 is a plan view of said figure;

Fig. 6 is a view of all the cards indicating the various types of playing figures;

Fig. 7 represents a cap or rider; and

Fig. 8 represents the reverse side of the chart or table shown in Fig. 2 and sets forth the count and explanation of the chart appearing on the front side.

Figure 1:
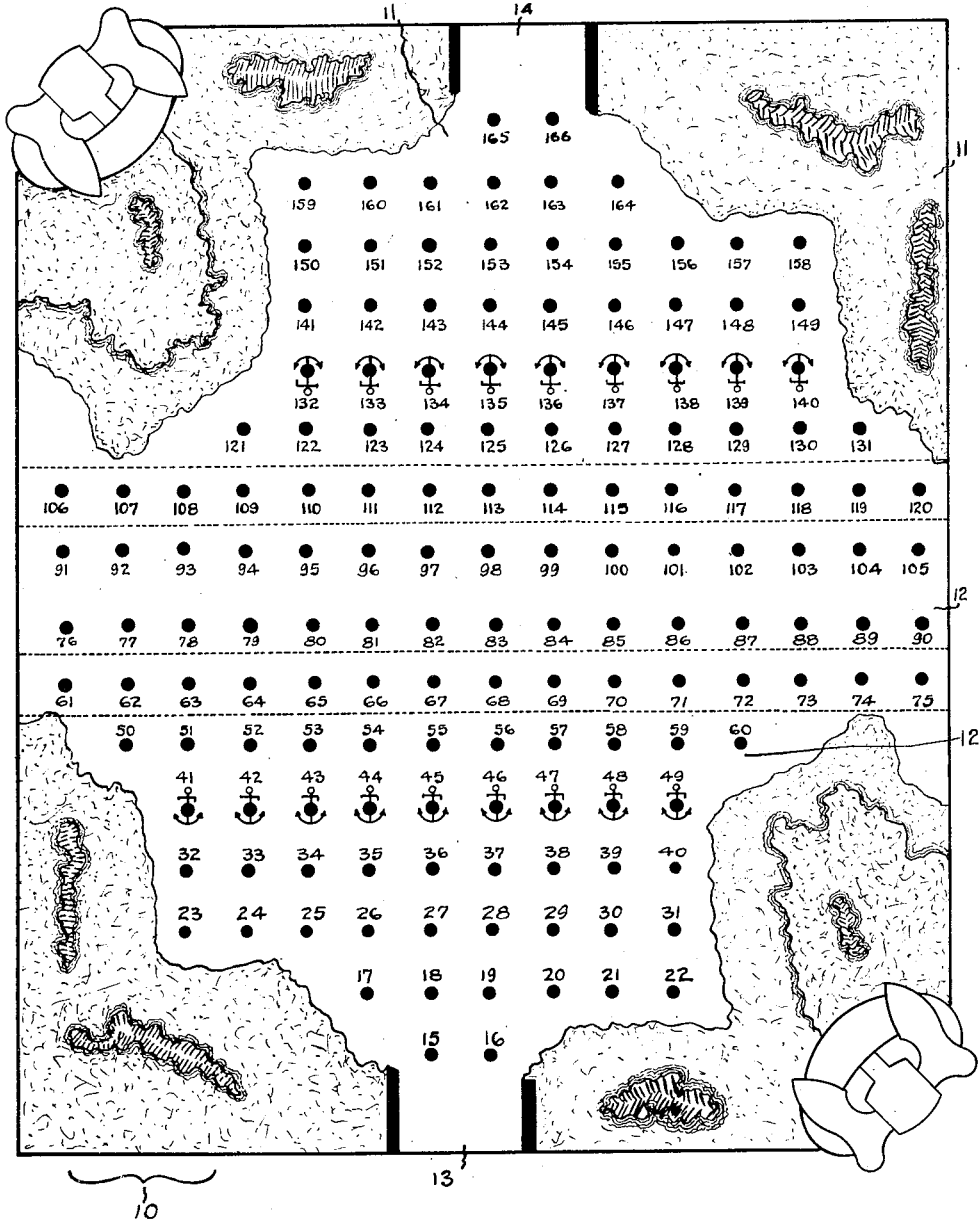
Figure 1 represents a field of play embodying my invention.

A field of play 10 is provided with an east and west bay 11 and 12, respectively, channels 13 and 14. Stations 15 to 166, incl., are disposed in said field conversely symmetrically as respects the east and west axis of the field,—there being the same number of stations on each side of the north and south axis of the field. Stations 41 to 49, and 132 to 140, incl. are provided with anchors and form the anchor line or boundary line of the bays on the sea side. Stations 61 to 75 and 106 to 120, disposed between dotted parallel lines, constitute "danger zones" on each side of the field, close to the entrances of the bays, where the enemy's mines can be laid (found), while stations 76 to 105 constitute the "open sea." The spaces 50–60, inclusive, and 121–131, inclusive, are defined as "approach zones." The different zones provided affect the play of vessels differently. For example, suppose a vessel of the character of mine-layer coming in from the west player attains station 115 in the danger zone of his opponent. Then said vessel cannot be removed except by a mine sweeper as herein explained.

The figures are formed with a base 167, with an upstanding card 168. This card may be secured to the base in any convenient manner, as by gluing, or may be releasably held between two upstanding wires 169, between which the cards may be inserted. The cards 168 may be provided with silhouettes of the various types of war-craft comprising the nation's navy, and/or the names of the said craft, and/or the initials of said craft as B. S.–1 for battleship, first class, or S. Cr. for scout cruiser.

The game may be played by two players, each being provided with a fleet consisting of: battleship, first class—1; battleship, second class—1; battleship, third class—2; cruisers—4; scout cruisers—2; destroyers—6; submarines—2; coastal defense submarines—1; subchasers—2; minelayers—2; minesweepers—4; transport—1; mines—2.

The total number of pieces for each player is thirty. The mines are to be stationed at a certain point "upon mobilization" and there the same must remain until removed by the opponent's minesweeper.

To start the game, each player places his figures upon any of the stations 15 to 49, and 132 to 166,—these stations representing the bays, and each player assuming the protection of the particular bays and task of overcoming the opposing fleet. The figures upon mobilization must not extend beyond the anchor line, i. e., 41 to 49, and 132, to 140, respectively, for each opponent. The number of stations within the bays preferably exceeds the number of figures comprising the fleet, so that there are some stations left unoccupied.

After the figures have been placed hit-or-miss upon the stations in the bays, a certain time agreed upon by the players is allowed for re-grouping of the fleet to form a "line of battle," i. e., to form the figures in such position as to expedite their movement forward into the open sea with the least number of moves, by way of carrying out some strategical or tactical problem as may appear to him best suited to win.

The first lead is to be determined by drawing lots, after which the players lead alternately and are allowed but one move at a time. All movable figures may move to a second adjoining station, (the mine being the only unit not movable), after being regrouped in the specified time allowed for mobilization, forward, back, to either side and diagonally,—in other words, north, south, east, west, northeast, northwest, southeast and southwest. However, some figures noted in the following instructions may be moved over more than one spot. Thus is taken into account the great speed of the particular figure thus designated as capable of passing over more than one space.

The mines are to be laid inside the anchor line, i. e., in the bays, upon any station deemed advisable, and after mobilization are not to be moved. The figure marked "Mine" is intended to represent a "mine-field" located on the space where this mine is placed. Therefore, logically, it is not to be taken off after having "blown up" one of the opponent's war craft.

The following constitutes special instructions referring to the figures:

Scout cruisers and destroyers, because of their greater speed, may be moved over one unoccupied station when such a move is deemed advantageous, i. e., these two figures may be moved from one station to a new position located in any direction with one unoccupied station intervening. In other words, said figures may be moved two stations on a single occasion of play. Thereby "greater speed" is accorded to these figures.

Minelayers,—offensive mines: We will call "offensive mines" those laid by means of minelayers. These minelayers are to be sent to the opponent's coast to mine the entrance of his bay. When these minelayers are at sea and crossing the player's danger zone, they are to be considered as movable figures, but when they enter the opponent's danger zone, they are to remain on the stations of this zone immovable, and these stations are to be considered as mined, provided, however, such mine-layer may be removed by a mine sweeper only, and all other vessels coming face to face with such mine-layer would be considered as blown-up. In other words, the minelayer is to be deemed the equivalent to an offensive mine, i. e., it constitutes a mine field, which is similar to that laid by the players inside of their bays at the time of mobilization.

Coastal defense submarines act only in the bays and may not pass beyond the lines of anchor.

Transports are to be sent to the opponent's channel to land the troops.

The object of each player is to defeat the opponent's fleet with the least possible loss of his own figures, using them according to their special function to the best advantage.

The battle consists of the meeting of two figures face to face,—i. e., the position when the figures are in front of each other and neither of the players know what kind of figure opposes him. When the moving thus brings two figures of opposing fleets in such oppositely disposed position, reference is made to the chart or table shown in Fig. 2, which indicates which figure must be removed,— each player showing the other his figure. Therefore, if the defender of the east bay has a battleship, first class, as his type of figure in such opposing position, and the other opposing figure is a cruiser, by referring to the chart it is seen that Battleship, first class, appears in the vertical column, and that fourth in order in the horizontal column the word "Cruiser" appears, the arrow being directed against the "cruiser." This means that upon a battleship, first class, meeting a cruiser, the cruiser is, for purposes of the game, considered as defeated and is removed from the field of play. On the other hand, if the type of figure of the west bay is a submarine, the term "Submarine" is found seventh in order in the horizontal list, and it is seen that the arrow is directed against the "battleship." This means that the battleship, for purposes of the game, is deemed defeated and the same is removed. When a battleship, first class, meets a battleship, first class, it is to be noted that a round dot is to be found at the intersection of the spaces indicating the vertical and horizontal ordinates, and this dot signifies that both of the figures are to be discarded; while the plus sign, which is found at the intersection of the vertical and horizontal ordinates for minelayer and minesweeper, signifies that neither of the figures are to be discarded.

If there is a third party acting as referee, then it would be the referee's duty to determine the result of the meeting according to the rules of the chart or table set forth in Fig. 2.

All movable figures are to be considered blown-up when they meet a mine, either in bay or in danger zone laid by the enemy, face to face, that is, when they happen to strike a mined field. Minesweepers are the only figures which can take off the mines by meeting them face to face.

Reconnoitering is the special function of scout cruisers and destroyers. That is, these figures are used to discover the "main forces," which consist of battleships and cruisers of the opponent's fleet.

In the game, when a scout cruiser or destroyer meets a battleship or a cruiser face to face, according to the rules of the chart in Fig. 2, they are discarded in favor of the battleship, but the identity of the battleship having been thus discovered by the opponent, the same thereafter is identified by a red cap or rider, which is to be put upon them, while the cruisers, when they are the victors in a corresponding single engagement, are identified by the blue caps or riders.

Without coming face to face, the scout cruisers may demand the identity of the opponent's battleships and cruisers in a space covered by fifteen stations, two to the left, two to the right, and two in direct file line forward of each of these first named stations, including the station occupied by the scout cruiser itself, whenever a player demands "Show the colors." That is, suppose a scout cruiser of the defender of the west bay, in which channel 13 is located, gains station 80, the said defender of the west bay may upon call "show the colors", and any figure on 78, 79, 81, 82, 93, 94, 95, 96, 97, 108, 109, 110, 111 and 112 reveal its identity, and if the same proves to be a battleship or cruiser, thereafter the same must be marked with its proper cap or rider, namely, red or blue, respectively.

The discarded figures are known to the opponent.

If a third party acts as referee, his duties are as follows: to call time at the end of mobilization and start the game; to determine the result of the meetings between figures according to the chart or table; to discard figures when required; to put on the caps, red and blue, respectively, when required; to prevent the players from moving the mines in the bays after the first lead; to give special attention to the regulations governing minelayers; to enforce in general the rules of the game; and, to determine the victory.

Victory is determined by the following conditions: 1, when all the movable figures of one of the opponents are discarded,—in other words, when his fleet is completely defeated; or, 2, when both players have only a few movable figures remaining in the field of play, and one of the players persistently avoids meeting the figures of his opponent,— in this case, the latter evidently has "command of the sea", if at the same time he is efficiently defending his channel against the possible entering of the enemy's transport.

The above determination of the winner may be sufficient for many players. However, it may be desired to know the magnitude of the victory, because the probabilities are that the players will end with vessels of different classes, and, furthermore, it may be desired, even prior to the two conditions set forth for absolute victory, to determine who is the relative winner by counting up the valuation of the various vessels, the valuation or count being made up as follows: Each battleship, first class, counts 100; each battleship, second class, 90; each battleship, third class, 75; each cruiser, 40; each scout cruiser, 30; each destroyer, 15; each submarine, 40; each coastal defense submarine, 25; and each subchaser, 10. The advantage of the victory belongs to the winner. It means that he alone counts the points of his figures left on the field of play after victory is determined. The figures of the defeated player, which may remain after victory is determined, are to be disregarded. Also, only the winner is to be rewarded for the successful operations of his figures; thus, for each discarded mine, either in the enemy's bay or danger zone, 25 points are to be added. For each war craft of the enemy blown up by means of a mine laid in the enemy's danger zone, 50 points are to be added. For the winner's transport successfully entering the enemy's harbor, 150 points are to be added. Also, if occasionally the transport of the enemy is blocked in the winner's channel, 150 points are to be added to the total number of points of the winner. In this case, the transport is supposed to have been captured by the winner.

The game without referee is intended for beginners, while the game with referee is intended for advanced players.

Obviously, changes may be made in the arrangement of the parts of my invention, without departing from the principles thereof, the above setting forth only a preferred form of embodiment.

I claim:

1. A game embodying a field of play representing the open sea and two bays; a danger zone adjacent each of said bays on the sea side; said field of play having stations marked at regularly spaced intervals thereon; an anchor line across the entrance of each bay; and two sets of movable playing members representing a plurality of the different classes of vessels composing a nation's navy, and representing one or more of each of said classes, said vessels being initially unidentified to the opponent, some of said vessels being non-movable and others movable in any directly or diagonally forward or sidewise direction, and some of said vessels or members being capable of requiring a "show of colors" within a fixed range of stations, said vessels upon meeting face to face being effective to require the removal of a vessel of less scheduled strength.

2. A game embodying a field of play representing the open sea and two bays; a danger zone adjacent each of said bays on the sea side; said field of play having stations marked at regularly spaced intervals thereon; an anchor line across the entrance of each bay; and two sets of movable playing members representing a plurality of the different classes of vessels composing a nation's navy, and representing the following vessels:—battleship, first class; battleship, second class; battleship, third class; cruiser; scout cruiser; destroyer; submarine; coastal defense submarine; subchaser; minelayer; mine sweeper; transport; mines,—said vessels being initially unidentified to the opponent, some of said vessels being non-movable and others movable in any directly or diagonally forward or sidewise direction, scout cruisers being assigned to the right to demand the identity of the opponent's vessels within a certain fixed range, said vessels on the occasion of each move being movable one station at a time excepting scout cruisers and destroyers which may move one or two stations at a time, and said vessels upon meeting face to face being effective to require the removal of a vessel of less scheduled strength.

3. A game embodying a field of play representing the open sea and two bays; a danger zone adjacent each of said bays on the sea side; said field of play having stations marked at regularly spaced intervals thereon; an anchor line across the entrance of each bay; and two sets of movable playing members representing a plurality of the different classes of vessels composing a nation's navy, and representing the following vessels:—one battleship, first class; one battleship, second class; one battleship, third class; four cruisers; two scout cruisers; six destroyers; two submarines; one coastal defense submarine; two subchasers; two minelayers; four minesweepers; one transport; two mines;—said vessels being initially unidentified to the opponent, some of said vessels being non-movable and others movable in any directly or diagonally forward or sidewise direction, scout cruisers being assigned the right to demand the identity of the opponent's vessels within a certain fixed range, said vessels on the occasion of each move being movable one station at a time excepting scout cruisers and destroyers which may move one or two stations at a time, and said vessels upon meeting face to face being effective to require the removal of a vessel of less scheduled strength.

4. A game embodying a field representing a marine site, two sets of movable playing members thereon, representing vessels of different classes, said classes of each set being normally unidentified to the opponent, and indicators attachable to the respective members acording to predetermined rules, to thereafter show the opponent the classes of such members.

In witness whereof, I hereunto subscribe my name this 28th day of September, 1925.

PAUL P. YEJOFF.